US008590033B2

(12) United States Patent
Schleiss et al.

(10) Patent No.: US 8,590,033 B2
(45) Date of Patent: Nov. 19, 2013

(54) ONE BUTTON SECURITY LOCKDOWN OF A PROCESS CONTROL NETWORK

(75) Inventors: Trevor D. Schleiss, Austin, TX (US); Robert K. Huba, Georgetown, TX (US)

(73) Assignee: Fisher-Rosemount Systems, Inc., Austin, TX (US)

( * ) Notice: Subject to any disclaimer, the term of this patent is extended or adjusted under 35 U.S.C. 154(b) by 450 days.

(21) Appl. No.: 12/475,889

(22) Filed: Jun. 1, 2009

(65) Prior Publication Data

US 2010/0077471 A1    Mar. 25, 2010

Related U.S. Application Data

(60) Provisional application No. 61/100,240, filed on Sep. 25, 2008.

(51) Int. Cl.
*H04L 29/06*         (2006.01)
(52) U.S. Cl.
USPC .............................................. 726/13; 726/27
(58) Field of Classification Search
USPC ...................................................... 726/27, 13
See application file for complete search history.

(56) References Cited

U.S. PATENT DOCUMENTS

| 6,124,692 | A  | * | 9/2000  | Canada et al. ................. 318/490 |
| 6,934,260 | B1 |   | 8/2005  | Kanuri |
| 7,187,648 | B1 |   | 3/2007  | Rangarajan et al. |
| 7,325,132 | B2 | * | 1/2008  | Takayama et al. ............ 713/168 |
| 7,782,813 | B2 | * | 8/2010  | Wheeler et al. ............... 370/328 |
| 7,836,160 | B2 | * | 11/2010 | Baum ............................ 709/223 |
| 2002/0156888 | A1 |  | 10/2002 | Lee et al. |
| 2006/0034181 | A1 |  | 2/2006  | Noguchi et al. |
| 2006/0053491 | A1 |  | 3/2006  | Khuti et al. |
| 2006/0250983 | A1 |  | 11/2006 | Hui |
| 2007/0043467 | A1 |  | 2/2007  | Rustad et al. |
| 2007/0076711 | A1 | * | 4/2007  | Shuster ......................... 370/389 |
| 2010/0077471 | A1 |  | 3/2010  | Schleiss et al. |

FOREIGN PATENT DOCUMENTS

EP         1 796 340 A1    6/2007

OTHER PUBLICATIONS

Communication pursuant to Article 94(3) EPC for Application No. 09 171 417.0-2413 dated Mar. 28, 2011.
Great Britain Search Report for Application No. GB0916858.4, dated Jan. 15, 2010.
Crevatin et al., "Security for Industrial Communication Systems," *Proceedings of the IEEE*, 63(6):1152-1177 (2005).

(Continued)

*Primary Examiner* — Gilberto Barron, Jr.
*Assistant Examiner* — Devin Almeida
(74) *Attorney, Agent, or Firm* — Marshall, Gerstein & Borun LLP

(57) ABSTRACT

Proper function and security of a complex network for communicating data within a process control system may be manually or automatically "locked-down" with a single command for an entire process control network or portions of the network. A user or application monitors network communication over multiple network devices. Once the network is configured and properly communicates data over the process control network, the application may lock down the network by deactivating or "locking out" access points on the network that are open and unused or have invalid connections. Locking down the network may essentially freeze it in a properly configured and functioning state and restrict future re-configuration of the network devices or harmful communication over an open or unused access point. When locked, is a currently connected device is unplugged and a different device is plugged into the access point, the network device may refuse the connection.

38 Claims, 9 Drawing Sheets

(56) References Cited

OTHER PUBLICATIONS

Guruprasad et al., "Security Features in Ethernet Switches for Access Networks," *IEEE Region 10 Annual Conference*, 3:1211-1214 (2003).

Kastner et al., "How Dynamic Networks: A Short Tutorial on Spontaneous Networks," *Proceedings IEEE International Conference*, pp. 295-303 (2001).

European Search Report for Application No. 09171417, dated Dec. 16, 2009.

Examination Report for GB Application No. 0916858.4 issued Mar. 5, 2012.

European Search Report for Application No. 13161640.1, dated May 14, 2013.

First Office Action for Chinese Application No. 200910177758.1, dated May 6, 2013.

Combined Search and Examination Report for Application No. GB1220624.9, dated Nov. 28, 2012.

\* cited by examiner

ONE BUTTON SECURITY LOCKDOWN OF A PROCESS CONTROL NETWORK

CROSS REFERENCE TO RELATED APPLICATION

This application claims the benefit of U.S. Provisional Application No. 61/100,240, filed Sep. 25, 2008, entitled "One Button Security Lockdown of a Process Control Network" and is entirely incorporated by reference herein.

FIELD OF TECHNOLOGY

This application relates generally to process plant control systems and, more particularly, to a method and apparatus for securely controlling the communication between devices in a process or plant environment.

DESCRIPTION OF THE RELATED ART

Process control systems, such as distributed or scalable process control systems like those used in power generation, chemical, petroleum, or other processes, typically include one or more controllers communicatively coupled to each other, to at least one host or operator workstation via a process control network and to one or more field devices via analog, digital or combined analog/digital buses. The field devices, which may be, for example valves, valve positioners, switches and transmitters (e.g., temperature, pressure and flow rate sensors), perform functions within the process or plant such as opening or closing valves, switching devices on and off and measuring process parameters. The controller receives signals indicative of process or plant measurements made by the field devices and/or other information pertaining to the field devices, uses this information to implement a control routine and then generates control signals which are sent over the buses to the field devices to control the operation of the process or plant. Information from the field devices and the controller is typically made available to one or more applications executed by the operator workstation to enable an operator to perform any desired function with respect to the process or plant, such as viewing the current state of the plant, modifying the operation of the plant, etc.

The process controllers, which are typically located within the process plant environment, receive signals indicative of process measurements or process variables made by or associated with the field devices and/or other information pertaining to the field devices, and execute controller applications. The controller applications implement, for example, different control modules that make process control decisions, generate control signals based on the received information, and coordinate with the control modules or blocks in the field devices such as HART® and Fieldbus field devices. The control modules in the process controllers send the control signals over the communication lines or signal paths to the field devices, to thereby control the operation of the process.

Information from the field devices and the process controllers is typically made available to one or more other hardware devices such as, for example, operator workstations, maintenance workstations, personal computers, handheld devices, data historians, report generators, centralized databases, etc., via the process control network. The information communicated over the network enables an operator or a maintenance person to perform desired functions with respect to the process. For example, the information allows an operator to change settings of the process control routine, modify the operation of the control modules within the process controllers or the smart field devices, view the current state of the process or status of particular devices within the process plant, view alarms generated by field devices and process controllers, simulate the operation of the process for the purpose of training personnel or testing the process control software, diagnose problems or hardware failures within the process plant, etc.

The field devices usually communicate with the hardware devices over the process control network, for example, an Ethernet-configured LAN. The network relays the process parameters, network information, and other process control data through various network devices and to various entities in the process control system. Typical network devices include network interface cards, network switches, routers, firewalls, controllers, and operator workstations. The network devices typically facilitate the flow of data through the network by controlling its routing, frame rate, timeout, and other network parameters, but do not change the process data itself. As the process control network grows in size and complexity, the number and type of network devices correspondingly increases. As a result of system and network growth, security and management in these complex systems may become increasingly difficult. For example, each network device may include one or more communication ports that provide an access point or port for physically inter-connecting the process control system components and other network devices to each other across the network. Most network devices include more ports than are needed to fully connect the device in the network, thus leaving one or more ports unused or open on the device. An open port on the device may, therefore, become an access point for network expansion by adding other devices or may allow an entity, malicious or not, to access the network and initiate unwanted and potentially harmful network traffic. Effectively monitoring or controlling access to all unused ports across a network that controls communication across a complex process control system rapidly becomes impractical as the number of network devices and associated access points increases.

While it is possible for a user or application to monitor the status and traffic of each device and port, it is often impossible to identify harmful communication until a problem occurs. Once a monitor identifies the problem, portions of the system must be brought off-line and diagnosed to initiate repair or troubleshooting efforts. Further, while a device or port at one physical location in the network may be identified as malfunctioning, the problem may have been initiated by a faulty or malicious connection at another location in the network. Also, after a technician completes troubleshooting or repair, the network device may be inadvertently left in an insecure state or otherwise left vulnerable to unwanted or malicious communication. Network security in a process control system on a device-by-device and port-by-port basis including physical inspection and repair of a suspect device to bring the system back online may involve lengthy delays, lead to dead ends, and present numerous other management difficulties that significantly decrease the effectiveness of the process control system.

SUMMARY OF THE DISCLOSURE

Process control system network security and management may be enhanced by monitoring network traffic at each network device through security functions at each device that may be activated on a device-by-device or network-wide basis. One or more Private Management Information Bases (MIBs), or other communications methods or data access methods such as using proprietary software solutions and open source software that may be used to access and change management functions on the network device at each device may include one or more methods that may be accessed through a command line interface (CLI) to monitor whether or not the device is communicating over the process control network, which ports on a device are able to communicate over the network, which ports are actually communicating over the network, and which ports are not communicating. Once the process control network is fully configured and functioning normally, a user or a monitoring application may send commands to the device to implement one or more private MIB methods to effectively freeze the network in its desired configuration by disabling or filtering addresses from selected unused, invalid, or otherwise undesirable ports on a specific network device by implementing a single "lockdown" command for the entire network.

The lockdown may result in a stable and secure network by restricting future re-configuration of the network and preventing unwanted or harmful communication over an open, invalid, or unused access point. When locked, if a currently connected device is unplugged and a different device is plugged into the access point, the network device may refuse the connection. For example, all unused access points on a network device may be disabled so that no additional devices may be added or connected to the network. A locked out access point may not be activated or unlocked without an authenticated command from a user, monitor, or other authorized process. For additional security, the lock down function may be applied to applications executing at various network nodes and the unlock function may be restricted to a manual process. The monitor may unlock and lock down at an application, device, or system-wide level. The access points may be deactivated by a combination of network and device configuration. For example, the lock down configuration may deactivate the access point by denying communication over the access point and may also re-configure the network device to remove power from an access point so that no connection to the network is possible through that access point.

DESCRIPTION

Figure 1A:
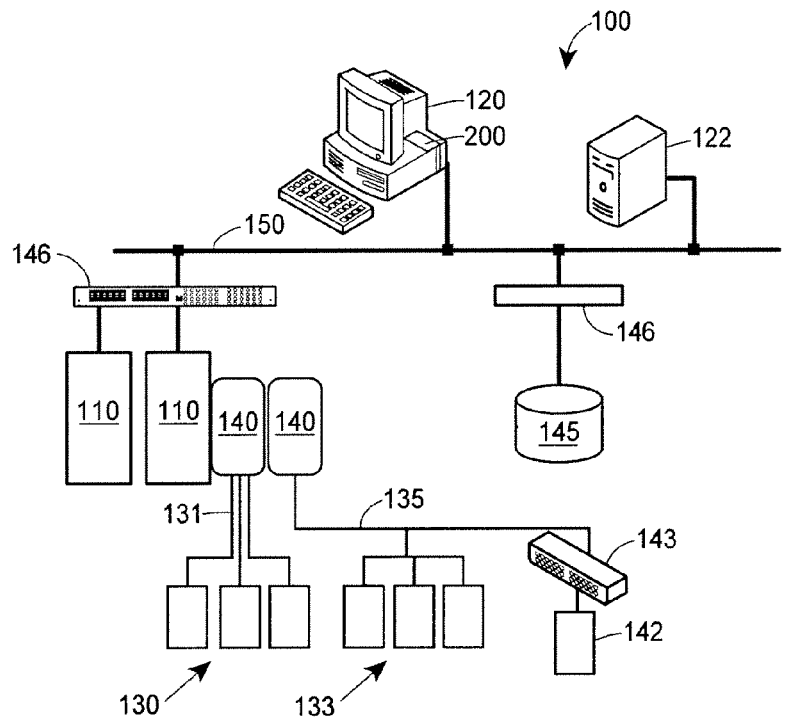
FIG. 1a is an exemplary block diagram of a process plant having a distributed process control system and network including one or more operator and maintenance workstations, controllers, field devices, and network devices configured to implement the lockdown functions as herein described, regular network devices, and supporting equipment.
Figure 1B:
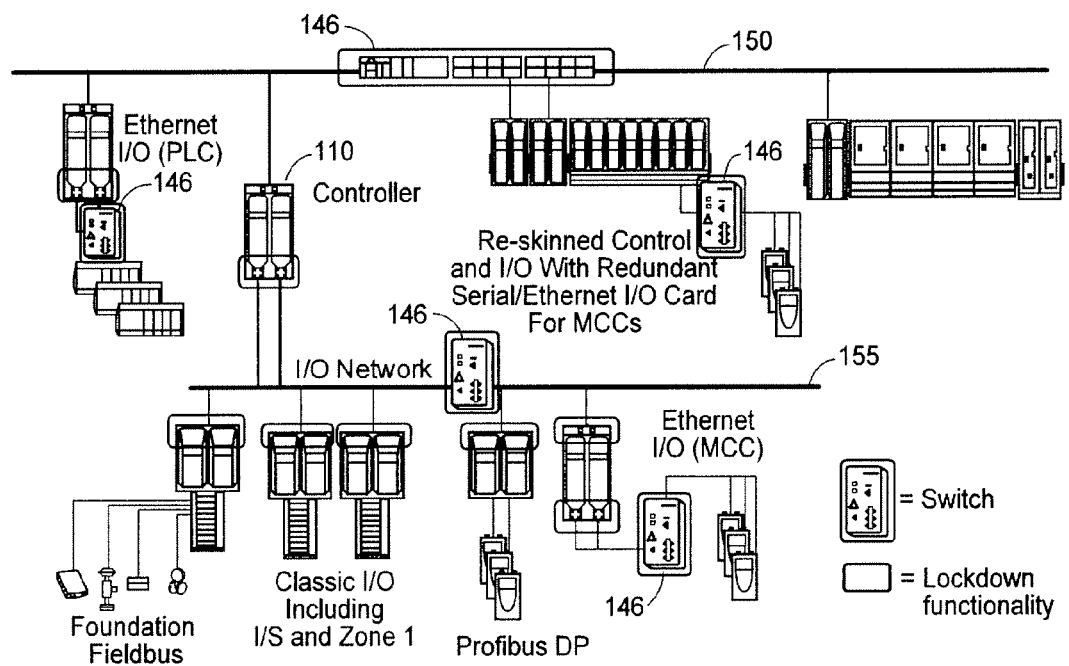
FIG. 1b is an exemplary block diagram including an I/O network portion of a process control network that includes devices configured to implement the lockdown functions as herein described.

FIG. 1a is a schematic representation of a process control system within a process plant in which network devices may be locked down to enhance network security and facilitate network management and maintenance. More specifically, a process control system 100 includes one or more process controllers 110 communicatively connected to one or more host workstations or computers 120-122 (which may be any type of personal computers, workstations, etc.), at least one having a display screen, via one or more network devices 145 over a process control network 150. Controllers 110 may include one or more network interface cards and are also connected to field devices 130 via input/output (I/O) cards 140. A data historian 145 may be any desired type of data collection unit having any desired type of memory and any desired or known software, hardware or firmware for storing data and may be separate from or a part of one of the workstations 120-122. The controller 110, which may be, by way of example, the DeltaV™ controller sold by Fisher Rosemount Systems, Inc., is communicatively connected to the host computers 120-122 by one or more network devices 146 via, for example, an Ethernet connection or any other desired communication network 150. A network device 146 includes one or more of a network interface card, a network switch, a router, a firewall, or any other device that facilitates data transmission over the network 150 without changing the underlying data over any portion of a network, for example, the network 150 and an I/O network 155 (FIG. 1b). As illustrated in FIG. 1b, any network device that is physically located at any portion within a network may include the lockdown functionality as herein described. The communication network 150 may be a local area network (LAN), a wide area network (WAN), a telecommunications network, etc. and may be implemented using hardwired or wireless technology. The controller 110 is communicatively connected to the field devices 130 using any desired hardware and software associated with, for example, standard 4 20 mA devices, standard Ethernet protocols, and/or any smart communication protocol such as the FOUNDATION Fieldbus protocol (Fieldbus), the HART protocol, etc.

The field devices 130 may be any type of devices, such as sensors, valves, transmitters, positioners, etc. while the I/O cards 140 may be any types of I/O devices conforming to any desired communication or controller protocol. In the embodiment illustrated in FIG. 1, the field devices 130 are HART devices that communicate over standard analog 4 20 mA lines 131 with a HART modem 140 while the field devices 133 are smart devices, such as Fieldbus field devices, that communicate over a digital bus 135 or I/O network 155 with an I/O card 140 using Fieldbus protocol communications. Of course, the field devices 130 and 133 could conform to any other desired standard(s) or protocols, including any standards or protocols developed in the future. The I/O network 155 and device 146 (FIG. 1b) as well as network 150 and device 146 (FIG. 1a) may also be standard Ethernet communications and network devices supporting any communications protocol (e.g., TCP/IP, ModbusIP, etc.).

Additionally, a field device 142 may be connected to the digital bus 135 via a specialized network device, for example, a gateway 143. For example, the field device 142 may only understand HART commands and the I/O network 135 may implement the PROFIBUS protocol. To this end, the gateway 143 may provide bidirectional PROFIBUS/HART translation. A network device 146 may also be positioned at or near the gateway 143.

The controller 110, which may be one of many distributed controllers within the plant having one or more processors therein, implements or oversees one or more process control routines. The routines may include one or more control loops that are stored in or associated with the controller. The controller 110 also communicates with the devices 130 or 133, the host computers 120-122 and the data historian 145 through the network 150 and associated network devices 146 to control a process in any desired manner. It should be noted that any control routines or elements described herein may have parts thereof implemented or executed by different controllers or other devices if so desired. Likewise, the control routines or elements described herein to be implemented within the process control system 100 may take any form, including software, firmware, hardware, etc. For the purpose of this discussion, a process control element can be any part or portion of a process control system including, for example, a routine, a block or a module stored on any computer readable medium. Control routines, which may be modules or any part of a control procedure such as a subroutine, parts of a subroutine (such as lines of code), etc. may be implemented in any desired software format, such as using ladder logic, sequential function charts, function block diagrams, object oriented programming or any other software programming language or design paradigm. Likewise, the control routines may be hard coded into, for example, one or more EPROMs, EEPROMs, application specific integrated circuits (ASICs), or any other hardware or firmware elements. Still further, the control routines may be designed using any design tools, including graphical design tools or any other type of software/hardware/firmware programming or design tools. Thus, the controller 110 may be configured to implement a control strategy or control routine in any desired manner.

Figure 1C:
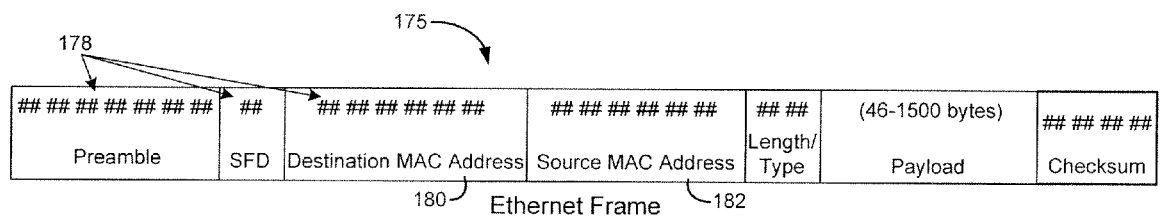
FIG. 1c is an exemplary Ethernet frame.

FIG. 1c illustrates a basic unit of data or a frame 175 that may be communicated through the process control system 100 generally and through the process control network 150 using the Ethernet protocol. An Ethernet frame 175 includes seven fields that each carry information between devices, for example, a network device 146 or other process control system 100 component. The fields may include a number of bytes of data 178 that are interpreted and processed by the receiving device. For example, the destination MAC address field 180 may include a physical address of the intermediate or destination node of the process control network 100, while the source MAC address field 182 may include a physical address of a sending or intermediate node of the process control system 100. The destination MAC address 180 and the source MAC address 182 fields may be used in conjunction with data from the network device 146 to process the data sent over the process control network 150. In some embodiments, the fields 180, 182 may be compared to one or more tables stored within a receiving network device when the device is in a "lockdown" status. The results of the comparison may be used to refuse or otherwise deny the received data or other physical or logical connections to the locked network device.

Figure 2:
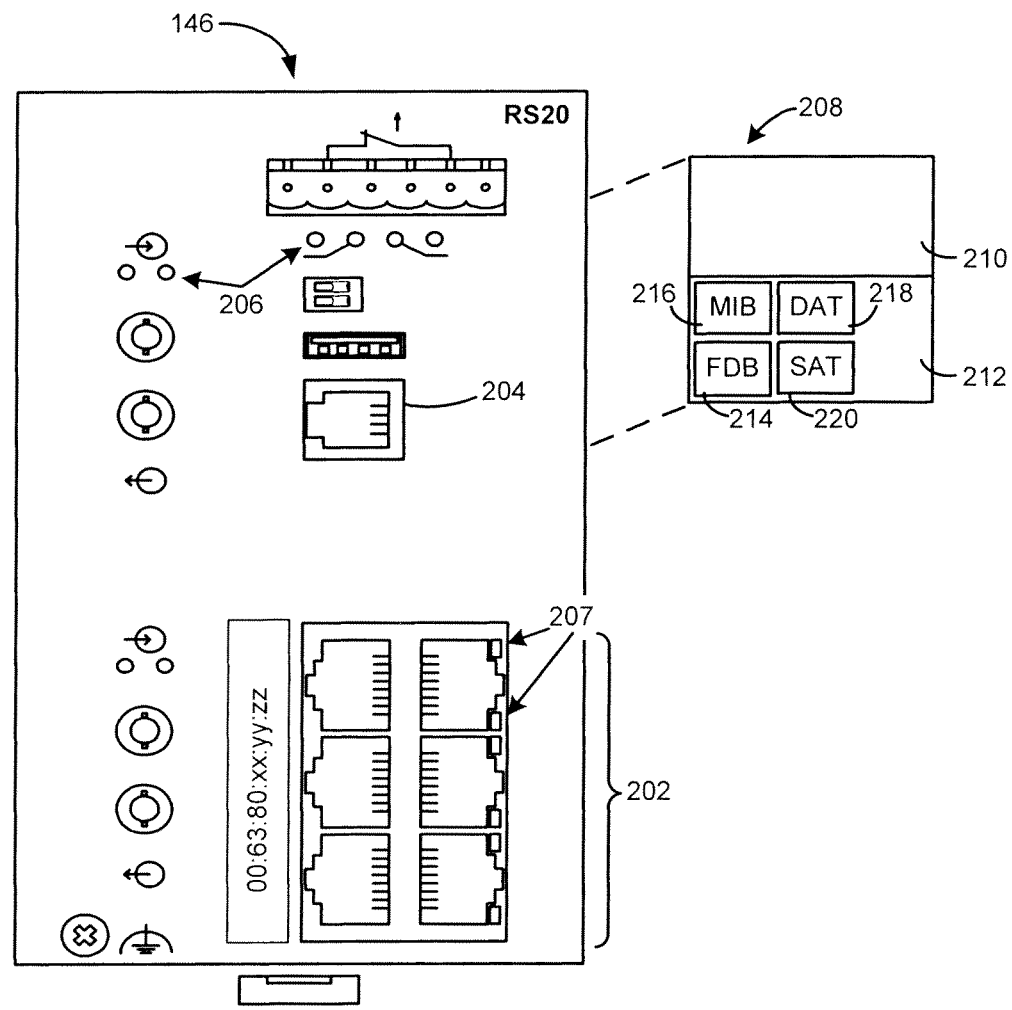
FIG. 2 is an exemplary network device.

FIG. 2 illustrates a typical network device 146 in the form of a network switch. Typically, a network device includes one or more communication ports 202, a management port 204, and status lights 206, 207. The communication ports 202 are used to interconnect various other network devices and process control system components for communication over the network 150, while the status lights indicate current operations of the network device and may be used for diagnostic purposes. For example, the lights 206 may correspond to a status of the device itself, for example, an indication of adequate power, a fault status, or a locked or unlocked status, as further explained below in relation to FIGS. 3 and 4. Other lights 207 may each correspond to a specific port and indicate network activity over the corresponding port and include a green LED corresponding to a link status of the port and a yellow LED corresponding to a data status of the port. Solid or blinking green and yellow status lights may indicate that the port is functioning and that a network device attached to the port is communicating data over the network 150 using the port. During a boot phase of the device 146, the status of the boot procedure may be displayed at the lights 207 as follows: not lit may indicate that the port 202 has no valid link or connection, while a solid green light may indicate a valid link and connection; slow flashing green may indicate that the port is switched to standby; fast flashing green may indicate that the port is disabled, i.e., that the port has been locked down as described below in relation to FIGS. 3 and 4; a not lit yellow light may indicate that there is no data reception on the port; and a flashing yellow light may indicate that there is data reception on the port. Of course, other status indications may be programmatically attached to the lights 206, 207, such as uplink communications failures, a "ready for operation" indication, flashing and/or color patterns for various faults or functioning modes, data rates, full and half duplex indications, testing modes, a media or data type communicated over the port, etc. The management port 204 may allow a user or network administrator to physically access and configure the network device 146, for example, implementing firmware upgrades or changes on the device 146 including implementing a private MIB, as described below. A "MIB" and "SNMP" may include all methods and communications used to access and change management information in the network devices.

In some embodiments, the network device 146 is an Ethernet switch manufactured by Hirschmann Automation and Control, GmbH, of Neckartenzlingen, Germany that is used in a DeltaV™ Process Control Network. For example, the switch 146 may be from one or more of the Open Rail, MICE, or MACH 100 family of Hirshmann network devices.

The switch 146 may include a management protocol for implementing the methods as described herein. For example, a Simple Network Management Protocol (SNMP) may provide management functions for the execution of network management and security procedures. In some embodiments, SNMP version 3 (SNMPv3) is implemented on the switch 146 with authentication and encryption enabled as the management protocol that interfaces with the DeltaV™ Process Control Network. For example, the switch 146 may include Message-Digest algorithm 5 (MD5) authentication with Data Encryption Standard (DES) using a 56-bit key for encryption (DES-56). Of course, other authentication standards employing a hash function with a 128-bit or better hash value and encryption standards employing a 56-bit or better key may also be implemented on the switch 146.

To enhance security of the switch 146, standard and proprietary management interfaces (Telnet, Web Interface, etc.) of the switch 146 may be disabled by default. A command line interface (CLI) may be accessed via a serial port or other secure access point of the switch 146 and authentication and encryption. A user or application may then employ the CLI to configure user and network information, as well as enable enhanced features of the device, if needed. The CLI may also be accessed by authentication through a secure shell (SSH) connection with sufficient encryption, for example, DES-56 encryption, and possession of a valid key such as a SSH-1-RSA key. Various levels of user privileges may be granted to change or update device features (e.g., the MIB or other device configurations). For example, a user may be granted read only access to the device 146 with a public password, while read/write access may only be granted with a private password. In some embodiments, a user must have write access on the switch 146 in order to access any of the previously-described configurations, implement the "lock down" functions, or set a timer to automatically lock down the network 150, as described below. Enhanced features beyond base level switching functions may be disabled in the device 146 for improved security of the process control network 150. For example, Profinet I/O and Ethernet/IP may be completely removed from the device 146 and implemented in another portion of the network 150. Further, the Spanning Tree may be disabled by default, however, it may be available via the CLI. The link layer discover protocol (LLDP) and the Dynamic Host Configuration Protocol (DHCP) client, and other functions may also be disabled to avoid the ability to employ "plug and play" network devices that may interfere with the lockdown and unlocking functions described herein. However, the network device 146 may be unmanaged in a default configuration to allow "plug and play" functionality within LANs and other networks 150 that have been specifically configured to allow these devices, for example, a network employing the DeltaV™ system. As with the Spanning Tree, the LLDP may be accessed and enabled, if desired, through the CLI.

The network device 146 may also include one or more standard and private management information bases (MIBs) 216 stored in memory 208 that may include a collection of objects that are accessible through the CLI for managing the network devices 146 and implementing functions that are specific to a process control network 150. One or more of the private MJBs may include objects for managing and controlling the lockdown and unlocking functions described herein. The private MJBs may also be an interface for DeltaV™ network security features through a runtime API that communicates with the network devices 146. The process control network 150 may be configured to include a mixture of network devices that include a private MIB for controlling lockdown and unlocking functions (i.e., "locking devices"), and commercial, off-the-shelf network devices that have no lockdown or unlocking functions. In any event, the lockdown and unlocking functions and procedures described below may not interfere with normal communications over the process control network 150 or within the process control system 100 as a whole.

The switch 146 may also include a memory 208 including volatile 210 and non-volatile 212 portions for storing computer-readable instructions for implementing network functions including initiating the lockdown and unlocking functions described herein, and storing other data related to the functions of the device 146. For example, an address resolution protocol (ARP) table and a forwarding database (FDB) table 214 may be stored in a Layer 3 (OSI model) network device (a router, a switch, a server, desktop, etc.). A Layer 3 network device 146 may perform both routing and switching in a single device and typically includes both an ARP and FDB table to forward received frames based on a complete network address. A Layer 2 network device (a switch or a bridge, etc.) may include the FBD table 214 to forward traffic based on the MAC addresses 180, 182 alone. While the lockdown and unlocking methods presented herein are generally discussed in terms of Layer 2 network devices, the methods could be equally applied to Layer 3 and other types of network devices.

The ARP table may be used by a network device 146 to store the IP address to MAC address entries for other network devices. The ARP table allows a device 146 to resolve IP addresses into MAC addresses. The ARP table may be populated as the network device 146 issues ARP broadcasts to the network 150 to resolve a network device's MAC address. When a device 146 receives a packet or other data that it needs to deliver to a locally attached interface, the device 146 may use the ARP table to discover what MAC address to insert into the frame header. A network device may use the FDB table 214 to store the MAC addresses that have been learned and the port 202 on which each MAC address was learned.

In normal operation, the network device 146 may dynamically learn the source MAC address 182 of frames 175 it receives by adding the source MAC address 182 and other source information to a dynamic address table 218 for each frame the device receives. The device 146 may update the dynamic address table 218 as stations are added or removed from the network 150 by adding new source MAC addresses and aging those MAC addresses that are not currently in use. At the expiration of an aging time, the device 146 may remove the MAC address from the dynamic address table 218. The network device 146 may also implement a static address table 220 that includes explicitly-entered MAC addresses and other information that does not age. The device 146 may perform normal network functions with any received frames that match information included in both the dynamic 218 and static address table 220. Functions implemented in the firmware of the device 146 may compare one or more of the ARP and the FDB table 214 with the dynamic and static address tables 218, 220 to process incoming frames 175.

In some embodiments, the IP, MAC, and other addresses may be added to ARP, FDB, and other tables while the network device 146 is in a normal or "unlocked" state and transparent bridging (for switches and dedicated bridges), learning, aging, forwarding, or other network device functions occur. In an "unlocked" state, when a network device 146 (e.g., an Open Rail switch produced by Hirshmann Automation and Control) receives an Ethernet frame 175, the device 146 may inspect the destination MAC address 180 and look to the FDB table 214 for address information to send that received Ethernet frame 175. If the FDB table 214 does not include information on the received destination MAC address, the device 146 may broadcast the Ethernet frame 175 to all ports in the network 150. Upon recognition of the broadcasted MAC at another network device, another frame may be sent to the broadcasting network device 146 that will add the discovered MAC address to the dynamic address table 218 and the FDB table 214. However, in a "lockdown" state (as further discussed below), the tables (i.e., one or more of the ARP and FDB tables) may be essentially frozen in their current configuration to prevent any further changes or additions. Previously-learned MAC addresses and other information that is included in the dynamic address table 218 at the time of locking may be moved to the static address table 220, and learning for the device 146 may be disabled. In a lockdown state, the FDB table 214 cannot be changed, thus preventing the device 146 from accepting and forwarding a frame 175 received from an unknown or not previously learned MAC address 182.

Figure 3A:
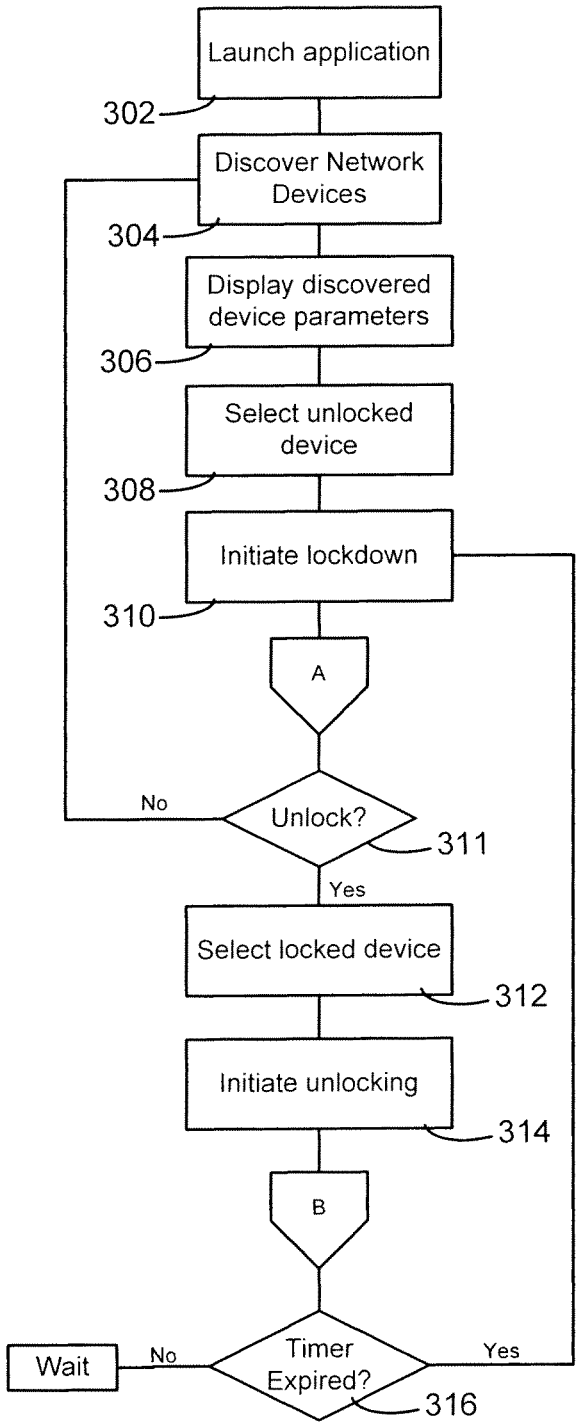
FIG. 3a is an exemplary block diagram of a method for locking and unlocking network devices and access points of a process control system and network.

FIG. 3a illustrates an exemplary method 300 for implementing lock down and unlocking of access points or ports 202 in a process control network 150 and an I/O network 155. In general, the method 300 allows a user of a process control system 100 to disable some functions of access points 202 or ports on network devices 146 within the process control network 150 and I/O network 155. For example, if a currently connected device is unplugged from a network device port 202 and a different device is plugged into the network device in its place, the port 202 may refuse the connection and alert a user interface, monitoring service, or other application executing on a workstation 120, 122 of the system 100. In the lockdown state, all unused or invalid ports 202 in the network 150, 155 may be disabled and no additional network devices 146 of any kind may be added or connected.

A user interface may provide a runtime interface with one or more private MIBs 216 to initiate lock down and unlocking procedures. One example of a user interface 400 to implement the lock down of a process control network 150 is illustrated in FIGS. 4a-4d. With reference to FIGS. 3a through 3c and FIGS. 4a through 4d, at block 302, a user may launch 302 a process control network security application that displays a user interface 400 to begin the lock down process. The application may automatically initiate network device discovery and identification 304 upon launch, or a user may manually initiate device discovery. The user interface 400 may display a status indication 402 of "Discovering Switches" or another indication that the network devices 146 of the process control network 150 are being identified. In some embodiments, the application may disable one or more function buttons 404 of the user interface 400 upon initiating network device discovery. A user may also manually initiate network device discovery. Block 304 may discover any network device 146 present within the process control network 150, or may selectively discover and identify only those network devices that include lock down functionality. Also, block 304 may search the network 150, 155 for devices 143, 146 using one or more parameters. For example, a specified range of IP addresses within the network 150, 155, a range of MAC addresses, or a specific number of network devices 143, 146 may be searched. A range of IP addresses having a beginning and ending IP address may be specified by the user or a range of IP addresses may be identified in a configuration of the network 150, 155 or discovered by the method 300. Block 304 may also identify specific network devices 143, 146 that include lockdown functionality by locating a private MIB 216 of the device 143, 146, a MAC or other address that has been previously identified as including lockdown functions, or other identification of the lockdown-enabled devices. The devices 143, 146 may be discovered for any portion of the network 150, 155 including one or more of a primary network 406 and a secondary network 408. Devices 146 within the primary network 406 may include IP addresses in a first range while devices 146 within the secondary network 408 may include IP addresses in a second range. Devices 146 that are discovered using ranges of IP addresses may reply with information that includes the specific IP address or other parameters of the discovered device 143, 146.

At block 306, parameters 425 of the devices 143, 146 (FIG. 4b) discovered at block 304 may be returned to the user interface 400. For example, an IP address 426, name 428, and status 430 may be shown in a primary network 406 window and a secondary network 408 window of the user interface 400. Once all network devices 146 have been discovered, the status indication 432 may indicate that the search is complete. In some embodiments, when the method 300 is initiated for a first time, or when the discovered devices have not otherwise been locked down, the status 430 may indicate that the discovered devices 146 are in an "unlocked" status 430. In an unlocked status, the devices may be able to perform all normal functions within the network 150. In some embodiments, ports in an unlocked status may perform the basic transparent bridging functions of learning, aging, and forwarding. A default aging time may be set to six-hundred seconds (ten minutes), although other default times may be set depending on the configuration of the device 146 and the network 150. Upon completion of the search, the one or more function buttons 434 may be available for selection by a user or by an automatic process.

At block 308, a user or automatic process may select one or more of the devices that is in an "unlocked" state and, at block 310, initiate a lockdown process by selecting one of the lock buttons 436. The lock buttons 436 may initiate processes to selectively initiate the lockdown for different portions of the process control network 150. For example, separate buttons may provide the ability to selectively lock the entire network, the primary network, the secondary network, individual devices, or specific access points at one or more selected devices. For additional security, the lockdown process may be initiated from only a selected workstation 120, 122 and may not be initiated through the Internet using, for example, a remote workstation that is not physical portion of the process control network 150 or may only be initiated from one or more pre-approved MAC addresses or IP addresses. Upon initiating the lockdown process by selecting one of the lock buttons 436, the method 300 may also initiate an authentication process. For example, the method 300 may request a username and password or other personal identification from the user to confirm access rights to the lockdown process. If the user is properly authenticated, the user may access objects of the private MIB 216 of an unlocked network device 428 to perform lockdown. In some embodiments, for locking functionality, the MAC addresses of the selected devices are considered, but not the IP addresses. In other embodiments, both the IP and MAC addresses may be considered, as described above.

Upon authentication after selecting one of the lock buttons 436, the method 300 may send a lock command to one or more private MIBs 216 of one or more selected devices. A private MIB 216 may then initiate one or more methods to disable all unused or invalid ports that have a port-specific locking mode enabled. For example, if any of the ports of the identified network devices 428 have no active link to another device at the moment the lock command is received by a device (e.g., indicated by one or more status lights 207—FIG. 2—of the network device 146, detected by identifying an active link variable for the port that equals "true," etc.), then that port is disabled. In some embodiments, disabling a port 202 includes refusing to accept any packet or frame 175 with a source MAC address 182 that is not included within an FDB 214 of the device 146 at the time the locking state is activated. For example, the FDB is essentially "frozen" in the locking state and the normal dynamic learning and aging functions are disabled. In other embodiments, disallowed host MAC addresses may be recorded in the memory 208 of the device 146 (e.g., known, malicious MAC addresses, a range of MAC addresses that belong to unauthorized devices, etc.) and any received packet or frame 175 that includes that disallowed source MAC address 182 is refused. The network devices 146 may initiate the lockdown process for both ports and MAC addresses of the selected device. Uplink ports of the selected devices 428 may also be locked in the same manner, and specific ports may also be excluded from the locking process. The method 300 may consider any or all available ports 202 of the network 150 at block 310.

Figure 3B:
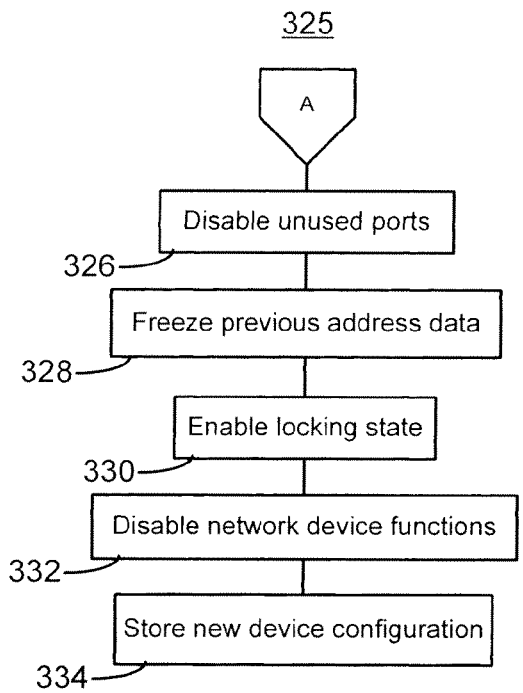
FIG. 3b is an exemplary block diagram of a method for locking a network device and an access point in a process control network.

FIG. 3b illustrates one embodiment of a method 325 for disabling one or more unused ports. The function blocks described below may be implemented as objects within the private MIB 216, for example, through a CLI, as previously described. At block 326, the method 325 may disable all unused ports 202 on the device 146 that are configured as a locking port and discovered by block 304, as previously described. If a specific port 202 or device 146 is selected from a listing of unlocked ports 428 (FIG. 4b), then the device or port may be disabled if it has no active link. Disabling an unused port 202 may also include removing electrical power from the port 202. At block 328, address information that was previously received at the device 146 may be frozen. In some embodiments, the information may be transferred from the dynamic address table 218 to the static address table 220. For example, the MAC addresses and other data may be completely removed from the dynamic address table 218 and moved to the static address table 220. Block 328 may include a maximum number of addresses to remove from the dynamic address table, for example, a maximum of 256 addresses. In some embodiments, if the current number of learned addresses within the dynamic address table 218 is more than a maximum number, only a subset of the addresses may be locked. The remaining addresses may then be removed from the FDB table 214 and may result in connectivity errors. Should connectivity issues occur, an error message may be sent to the user interface to indicate a failure in the lockdown process.

At block 330, the method 325 may put the port 202 into a locking state by implementing one or more methods from the private MIB 216. For example, private MIB methods may remove the electrical power from the port or re-configure the port to no longer accept any frames 175 from hosts that are disallowed or not included on one or more of the FDB table 214 or the static address table 220. At block 332, the method 325 may disable typical functions for the device 146. In one embodiment, the method 325 disables the address learning and address aging functions for the device 146 or specific port 202. For example, the dynamic address table 218 may be disabled and no longer accept any entries, the device 146 may no longer flood the network 150 to discover new addresses, and the previously-received addresses may not be removed from the device after the aging time has expired. At block 334, the device configuration may be stored in the non-volatile memory 212. For example, the port states and MAC addresses may by stored either automatically or explicitly by a user. Saved current configuration may be used by the device 146 upon power cycling or re-boot to prevent forcing open a locked port.

Figure 4A:
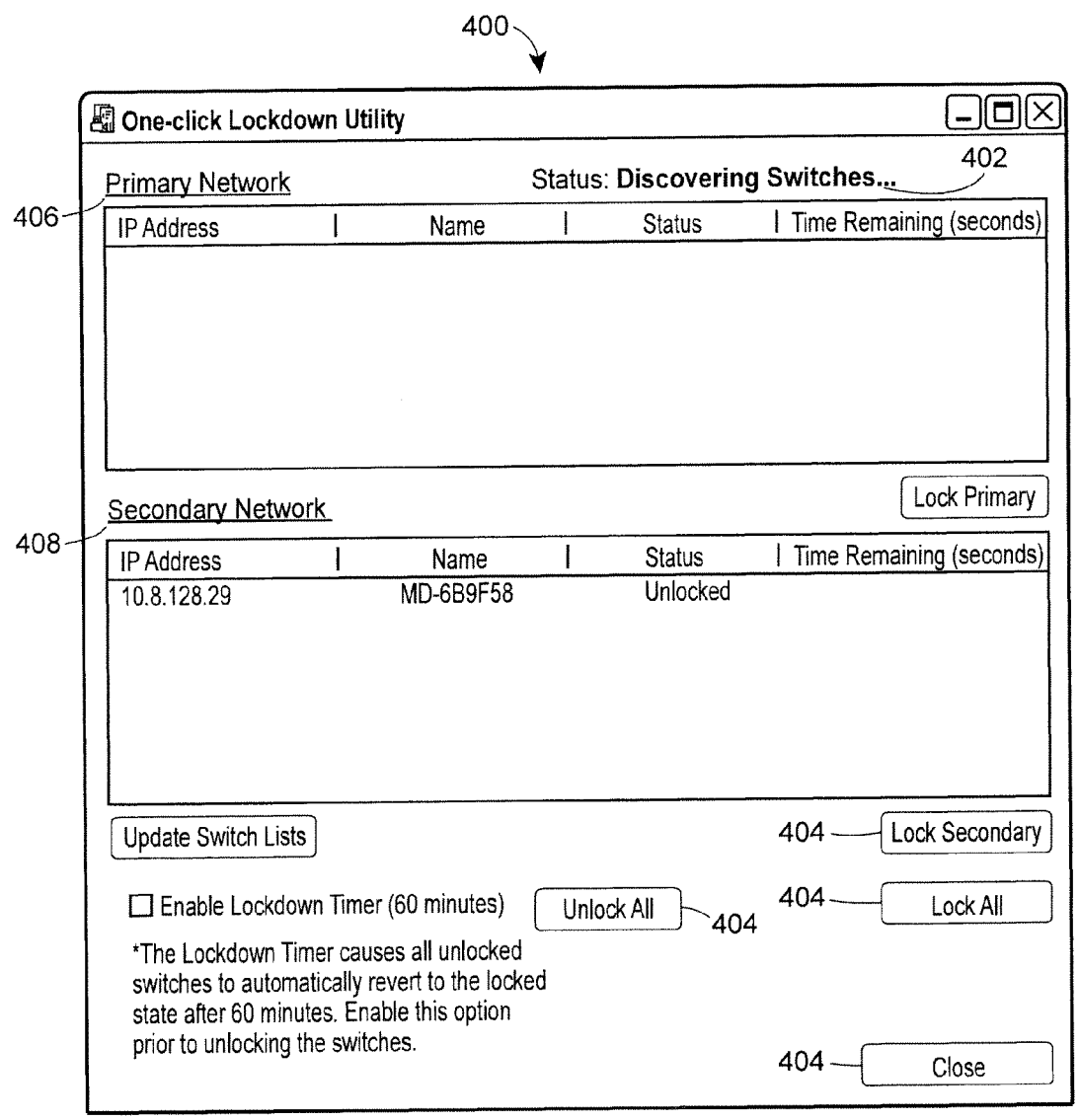
FIGS. 4a through 4d are exemplary portions of a user interface for implementing the methods of FIGS. 3a-c for locking and unlocking network devices and access points of a process control system and network.
Figure 4B:
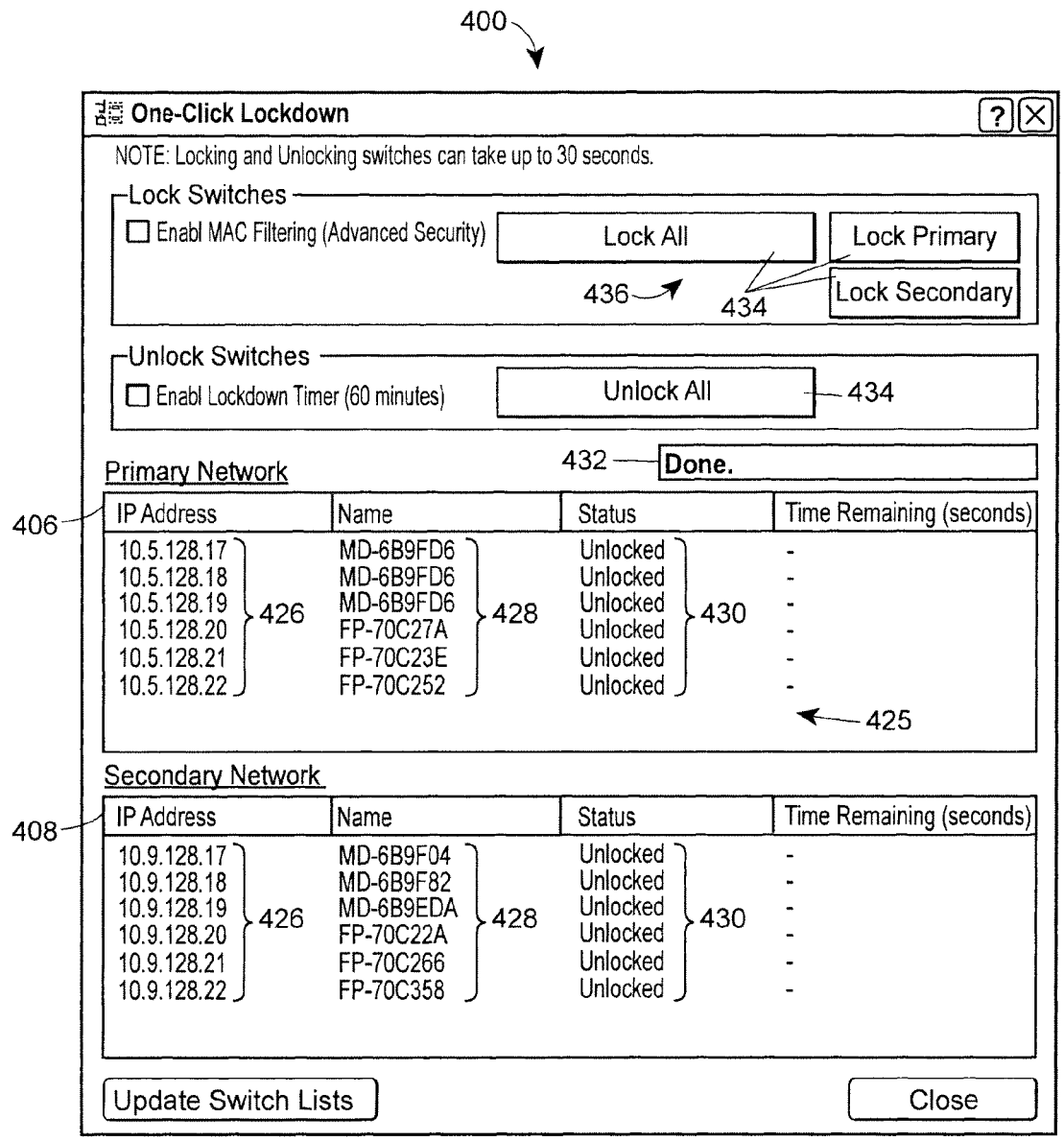
Figure 4C:
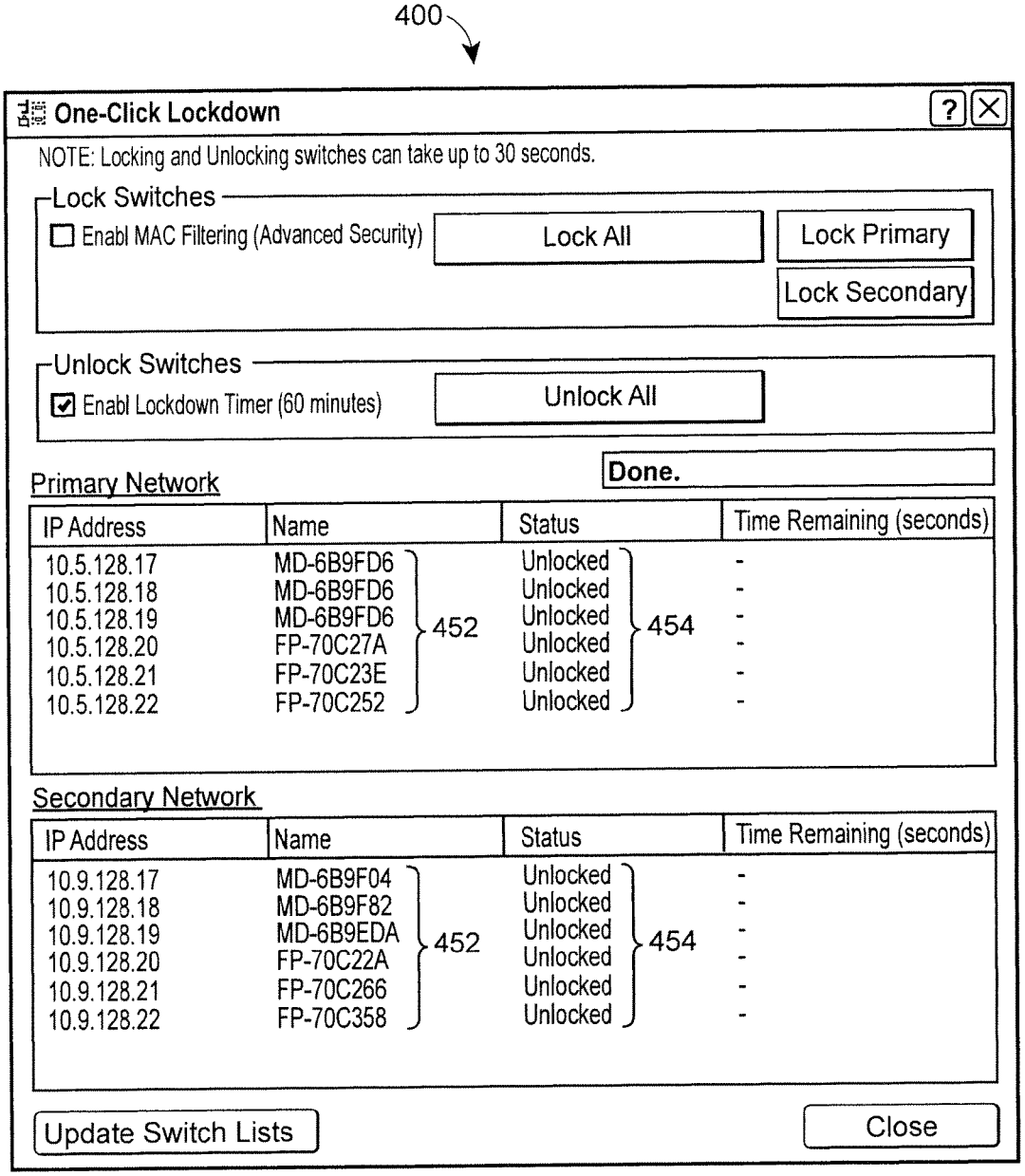

Upon locking, if a currently-connected device is unplugged from a network device port and a different device is plugged into the same port, the network device may refuse the connection. In some embodiments, the network device 146 refuses the connection because the new device is not included on the modified FDB table 214, as described above. However, if the same authorized device is reconnected to the same port, the network device 146 may permit and re-establish communications with the device. Communication may be re-established with a previously-connected device because the modified FDB table 214 will include the MAC address. Because communication with other network devices is controlled by each device's FDB 214, the network device 146 itself may refuse the connection. After initiating the lockdown process at block 310, the user interface 400 may change one or more of a device status 430 from "unlocked" or a status indication 432 from "done" to an indication that the selected devices 428 are performing private MIB 216 methods to lock unused ports, as described above. With reference to FIG. 4c, upon completion of the lockdown process at block 310, the user interface may display a listing of the locked devices 452 for the primary and secondary network. The locked devices 452 may include a status 454 of "locked" or any other indication that the locking process is complete.

After executing the lockdown process 325 for one or more network devices, one or more of the locked devices may need to be unlocked, for example, during troubleshooting operations, routine maintenance, diagnostics, network re-configuration, etc. At block 311, if one or more devices or ports need to be unlocked, the method 300 may continue to block 312, or, if no network devices or individual ports need to be unlocked, the method may return to block 304 to monitor for any changes in the network 150.

Figure 4D:
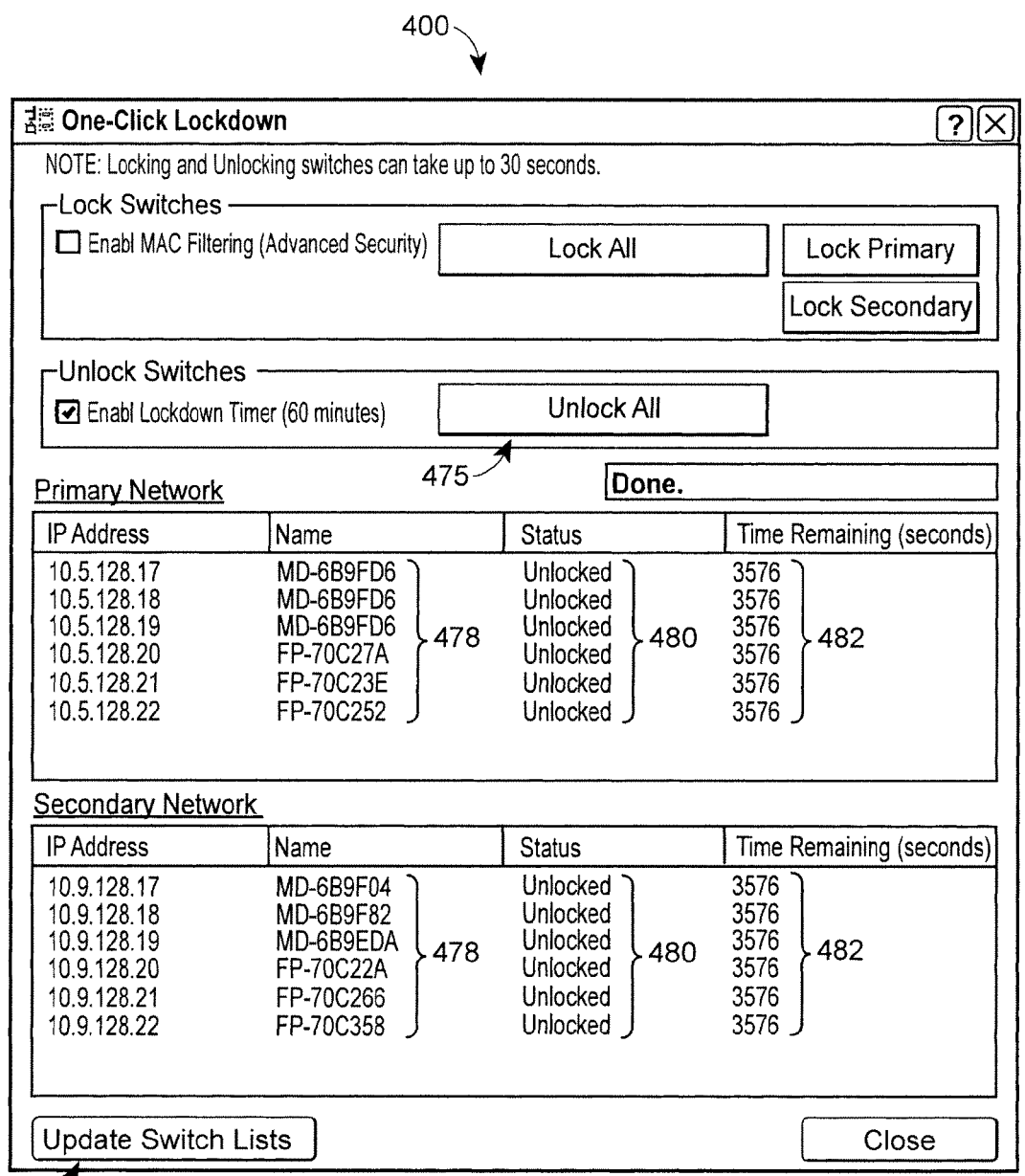

At block 312 (FIG. 3a), a user or automatic process may select one or more of the devices that is in a "locked" state and, at block 314, initiate an unlocking process by selecting an unlock button 475 (FIG. 4d). As with the lock buttons 436 (FIG. 4b), the unlock button 475 may initiate one or more methods of one or more private MIBs 216 to selectively initiate the unlocking process for different portions of the process control network 150 that were previously locked. For additional security, the unlocking process may be configured with a lockdown timer 476 that will automatically re-lock one or more of the devices 478 or individual ports that were previously locked. The lockdown timer 476 may be configured with a default setting wherein, upon expiration of a period of time after completion of the unlocking process (block 316), one or more of the unlocked devices may be re-locked (block 310). In one embodiment, the lockdown timer 476 is configured with a default setting of sixty minutes (i.e., thirty-six hundred seconds). The unlocking process may be initiated from a selected workstation 120, 122 and may not be initiated through the Internet using, for example, a remote workstation that is not physical portion of the process control network 150 or may only be initiated from one or more pre-approved MAC addresses.

The unlocking process may also include an authentication process. For example, the method 300 may request a username and password or other personal identification from the user to confirm access rights to the lockdown process. If the user is properly authenticated, the user may access the private MIB 216 of the one or more selected locked network devices 478 or ports 202 to initiate unlocking.

Figure 3C:
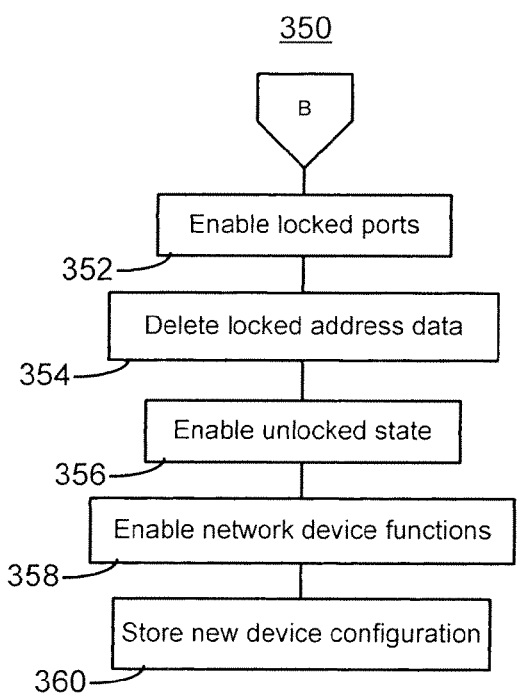
FIG. 3c is an exemplary block diagram of one embodiment of a method for unlocking a previously-locked network device and access point in a process control network.

Upon authentication, after selecting the unlock button and optionally selecting the lockdown timer 476, the method 300 may send an unlock command to the private MIB of the selected locked devices 478. FIG. 3c illustrates one embodiment of a method 350 for unlocking or enabling a previously-disabled port or device. The function blocks described below may be implemented as objects within the private MIB 216, for example, through a CLI, as previously described. At block 352, the method 350 may enable a previously-locked port or device. In some embodiments, all unused ports that were disabled by the locking method 325 will be enabled while ports that were individually locked by a user will remain locked. In other embodiments, all locked ports or devices may be enabled, or some locked ports and devices may be optionally enabled. At block 354, the address data that was previously added to the static address table 220 in block 328 may be deleted. In some embodiments, static address data that was added by a user or other explicit process may be retained in the static address table 220 during unlocking. At block 356, the method 350 may enable an unlocked state for the port or device. For example, the electrical power to the port may be activated and/or the port may resume accepting frames 175 from any source MAC address 182. At block 358, the method 350 may resume normal port or device functions. For example, in an unlocked state, the typical learning and aging functions that were suspended at block 330 above may be resumed and the device tables (i.e., ARP, FDB, static and dynamic address tables) may be re-populated. At block 360, the method 350 may store the new device or port configuration. For example, the port states and MAC addresses may by stored either automatically or explicitly by a user to be implemented by the device upon power cycling or re-boot.

In some embodiments, after initiating the unlock process at block 314, the user interface 400 (FIG. 4d) may change one or more of a device status 480 from "locked" to an indication that the selected devices 478 are in a "lock pending" status. Additionally, if the lockdown timer 476 is initialized with the unlocking process, a time remaining status 482 may indicate an amount of time remaining before the devices 478 revert to a locked status The time remaining 482 may also be configured to never revert to the locked status. For example, an object of the private MIB 216 may be accessed through the CLI to configure the timer 482 to a "never revert" status, or any other amount of time.

In some embodiments, a network device may revert to the configuration saved in block 334 (FIG. 3b) upon power up. For example, an entity may attempt to connect an unauthorized device to the process control network 150 by cycling the power of one or more network devices to force open a locked port. Upon power on, the devices may be configured to access the saved configuration of the device from its non-volatile memory 212 (FIG. 2). Therefore, regardless of whether or not a power cycled device reverts to a locked or unlocked state, all devices connected to the network 150 before the power cycle may automatically re-establish communication with the system while any new device added to the port while the power was off will be refused. If the device powers on with a status of "unlocked" and the lockdown timer 476 is greater than zero, the device may automatically enter a locked state after expiration of that time.

The device status may be periodically refreshed, for example, every fifteen seconds, to display the most current status. Additionally, an update button 484 may allow a user to manually refresh the status of the displayed network devices 478 or may allow discover of network devices that have been added to the network 150. In one embodiment, selecting the update button 484 may initiate the discovery of the network devices as described above in relation to block 304 and 306 (FIG. 3).

While the network device lockdown techniques described herein have been described herein as being used in conjunction with Fieldbus and standard 4 20 ma devices, they can, of course, be implemented using any other process control communication protocol or programming environment and may be used with any other types of devices, function blocks or controllers. Although the network device lockdown routines described herein are preferably implemented in software, they may be implemented in hardware, firmware, etc., and may be executed by any other processor associated with a process control system. Thus, the methods 300, 325, and 350 described herein may be implemented in a standard multi purpose CPU or on specifically designed hardware or firmware such as, for example, ASICs, if so desired. When implemented in software, the software may be stored in any computer readable memory such as on a magnetic disk, a laser disk, an optical disk, or other storage medium, in a RAM or ROM of a computer or processor, etc. Likewise, this software may be delivered to a user or to a process control system via any known or desired delivery method including, for example, on a computer readable disk or other transportable computer storage mechanism or modulated over a communication channel such as a telephone line, the internet, etc. (which is viewed as being the same as or interchangeable with providing such software via a transportable storage medium).

Thus, while the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

What is claimed is:

1. A method for securely communicating process control data via a process control network comprising:
   discovering a network device that is communicatively connected to the process control network;
   removing one or more authorized physical addresses that each correspond to a valid node of the process control network from an address resolution protocol table or a forwarding database table of the network device;
   transferring the removed authorized physical addresses to a static address table of the network device, wherein authorized physical addresses at the static address table do not age;
   suspending one or more bridging functions of the network device, wherein the bridging functions include address learning, aging, and forwarding for the address resolution protocol table or the forwarding database table of the network device;
   processing a frame received at the network device if the frame includes an authorized physical address that corresponds to an address of the static address table; and
   dropping the received frame if the frame includes an unauthorized physical address that does not correspond to an address of the static address table.

2. The method of claim 1, further comprising selectively disabling one or more communication ports of the network device by freezing the forwarding database table of the network device.

3. The method of claim 2, wherein selectively disabling one or more communication ports of the network device includes one or more of removing electrical power from one or more communication.

4. The method of claim 1, further comprising selectively enabling one or more previously disabled communication ports by resuming the one or more bridging functions of the network device.

5. The method of claim 4, further comprising disabling an enabled communication port after expiration of a threshold period of time.

6. A method for locking down one or more access points in a process control network comprising:
   identifying a network device of the process control network, the network device including both a valid access point and an invalid access point, wherein the valid access point includes one or more of an active link to a node of the process control network and a wired connection to the process control network and the invalid access point either includes an inactive link to a node of the process control network or is not connected to the process control network; and
   disabling any remaining invalid access points of the network device by one or more of:
   removing one or more authorized physical addresses that each correspond to the valid access point of the process control network from an address resolution protocol table or a forwarding database table of the valid access point, transferring the removed authorized physical addresses to a static address table of the valid access point, wherein authorized physical addresses at the static address table do not age, and suspending one or more bridging functions of the network device, wherein the bridging functions include learning, aging, and forwarding, and removing an ability of the invalid access point to receive electrical power while maintaining electrical power to the valid access point.

7. The method of claim 6, wherein the network device includes a network interface card, a network switch, a router, a firewall, a controller, and a workstation.

8. The method of claim 6, wherein the one or more access points include one or more network device ports.

9. The method of claim 6, further comprising enabling the previously disabled access points.

10. The method of claim 6, further comprising enabling the previously disabled access points for a period of time.

11. The method of claim 6, further comprising disabling the invalid access points in response to one or more of expiration of a time period, identification of a network security threat, a conclusion of a network maintenance period, an unexpected network event, or a network parameter change.

12. The method of claim 6, further comprising receiving information from the network device at a user interface, the information indicating which, if any, invalid access points are disabled.

13. The method of claim 6, further comprising the network device reporting to a user interface an attempt to enable the invalid access points that have been disabled.

14. The method of claim 6, wherein, if the invalid access points are disabled, communication of process control data in the process control network only occurs over the valid access points.

15. The method of claim 6, further comprising disabling and enabling the invalid access points at a local physical node of the process control network.

16. The method of claim 6, further comprising denying any connection to the disabled, invalid access point.

17. An apparatus for securely communicating process data via a process control network comprising:
a private management information base including one or more security modules;
a plurality of communication ports for communicatively connecting one or more nodes of the process control network and receiving frames via the process control network; and
a management protocol module;
wherein the one or more security modules are configured to selectively disable and enable one or more of the plurality of communication ports, disabling including:
moving a process control network node address from an address resolution protocol table or a forwarding database table of the process control network node to a static address table of the process control network node,
erasing the address resolution protocol table or the forwarding database table after moving the process control network node address,
preventing storing of process control network node addresses within the static address table, and
suspending one or more bridging functions of the network device, wherein the bridging functions include aging,
and the management protocol module is configured to one or more of forward, learn, and age the process control network node address from a frame received at a communication port, via the process control network, the address corresponding to the process control network node.

18. The apparatus of claim 17, wherein the one or more security modules that are configured to selectively disable the communication port are further configured to suspend one or more of the forward, learn, and age configurations of the management protocol module.

19. The apparatus of claim 17, wherein the management protocol module is further configured to store the dropped frame.

20. The apparatus of claim 17, wherein the one or more security modules are further configured to delete the one or more moved addresses from the static address table upon enabling the communication port.

21. The apparatus of claim 17, wherein the one or more security modules are further configured to remove electrical power from a communication port upon disabling the communication port.

22. The apparatus of claim 17, further comprising a timer that is configured to enable the communication port after expiration of a period of time after disabling the communication port.

23. The apparatus of claim 22, wherein the private management information base includes the timer.

24. The apparatus of claim 17, further comprising a command line interface to access the one or more security modules of the private management information base.

25. The apparatus of claim 24, further comprising a user interface for communicating a command to the apparatus via the command line interface, the command instantiating one or more security modules of the private management information base.

26. A method for securely communicating process control data via a process control network including one or more network devices, the method comprising:
discovering a network device communicatively connected to the process control network, the network device including an active communication port and an inactive communication port, wherein the active communication port includes an active communication link to another network device of the process control network and the inactive communication port includes no active communication link to another network device of the process control network;
disabling the active communication port by removing one or more authorized physical addresses that each correspond to a valid node of the process control network from an address resolution protocol table or a forwarding database table of the network device, transferring the removed authorized physical addresses to a static address table of the network device, and suspending one or more bridging functions of the network device, wherein the bridging functions include address learning, aging, and forwarding for the address resolution protocol table or the forwarding database table of the network device;
disabling the inactive communication port;
receiving one or more frames at the discovered network device; and
dropping each frame received at the disabled inactive communication port and received at the active communication port wherein an address of the static address table does not correspond to an address of the received frame.

27. The method of claim 26, wherein each inactive communication port further includes no wired connection to the process control network.

28. The method of claim 26, wherein disabling the inactive communication port includes identifying one or more communication ports that each include a valid link to another network device and disabling any remaining unidentified communication ports.

29. The method of claim 26, further comprising storing one or more of the static address table and a forwarding table of the network device in a non-volatile memory of the network device.

30. The method of claim 29, further comprising reverting to one or more of the stored static address table and the forwarding table upon re-booting the network device.

31. The method of claim 26, wherein disabling the inactive communication port includes the discovered network device refusing to accept a frame that includes a source MAC address that is not included within one or more of an address resolution protocol table and a forwarding database of the discovered network device.

32. The method of claim 26, wherein disabling the inactive communication port includes freezing a forwarding database table of the discovered network device.

33. The method of claim 26, wherein disabling the inactive communication port includes disabling one or more transparent bridging functions of the discovered network device, the functions including learning, aging, and forwarding.

34. The method of claim 26, wherein disabling the inactive communication port includes removing electrical power from the unused communication ports.

35. The method of claim 26, wherein dropping each frame communicated to the disabled inactive communication port includes storing the dropped frames.

36. The method of claim 26, wherein dropping each frame communicated to the disabled inactive communication port includes dropping one or more frames that are not included in one or more of a forwarding database table or a static address table of the network device.

37. The method of claim 26, wherein the process control network includes a primary network and a secondary network.

38. The method of claim 26, further comprising disabling one or more uplink unused communication ports of the discovered network devices.

* * * * *